US 9,897,981 B2

(12) United States Patent
Dwelley et al.

(10) Patent No.: US 9,897,981 B2
(45) Date of Patent: Feb. 20, 2018

(54) DETECTION AND CLASSIFICATION SCHEME FOR POWER OVER ETHERNET SYSTEM

(71) Applicant: Linear Technology Corporation, Milpitas, CA (US)

(72) Inventors: David Dwelley, Santa Barbara, CA (US); Jeffrey Heath, Santa Barbara, CA (US); Kirk Su, Santa Barbara, CA (US); Ryan Huff, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 391 days.

(21) Appl. No.: 14/501,517

(22) Filed: Sep. 30, 2014

(65) Prior Publication Data

US 2015/0091391 A1    Apr. 2, 2015

Related U.S. Application Data

(60) Provisional application No. 61/885,195, filed on Oct. 1, 2013.

(51) Int. Cl.
  *G05B 11/01*   (2006.01)
  *H02J 3/00*    (2006.01)
  *H04L 12/10*   (2006.01)

(52) U.S. Cl.
  CPC ............... *G05B 11/01* (2013.01); *H02J 3/00* (2013.01); *H04L 12/10* (2013.01); *Y10T 307/858* (2015.04)

(58) Field of Classification Search
  None
  See application file for complete search history.

(56) References Cited

U.S. PATENT DOCUMENTS 9,377,794 B1 * 6/2016 Dwelley ............... G05F 1/462
2006/0092000 A1   5/2006 Karam et al.
(Continued)

FOREIGN PATENT DOCUMENTS

JP    2008-529353 A    7/2008
JP    2008-529359 A    7/2008

OTHER PUBLICATIONS

PCT/US2014/058558, "International Search Report and Written Opinion," dated Dec. 1, 2014, 13 pages.

*Primary Examiner* — Jared Fureman
*Assistant Examiner* — James Evans
(74) *Attorney, Agent, or Firm* — Patent Law Group LLP; Brian D. Ogonowsky (57) ABSTRACT

In a method performed by a PoE system, a PSE provides data and operating voltage over Ethernet wires to a PD. Before the full PoE voltage is supplied, the PSE generates a low current signal received by the PD. A circuit in the PD, connected across its input terminals, has a characteristic analog response to the PSE signal corresponding to the PD's PoE requirements, such as whether the PD is a Type 1 or Type 2 PD. The circuit may be a certain value capacitor, zener diode, resistor, or other circuit. The PSE may generate a fixed current, fixed voltage, or time varying signal. Upon the PSE sensing the magnitude of the analog signal response at a particular time, the PSE associates the response with the PoE requirements of the PD. The PSE then applies the full PoE voltage in accordance with the PD's PoE requirements.

10 Claims, 6 Drawing Sheets

(56) References Cited

U.S. PATENT DOCUMENTS

| | | |
|---|---|---|
| 2006/0164769 A1 | 7/2006 | Stanford et al. |
| 2006/0168459 A1* | 7/2006 | Dwelley ................. H04L 12/10 |
| | | 713/300 |
| 2007/0103829 A1 | 5/2007 | Darshan et al. |
| 2007/0165548 A1 | 7/2007 | Woo et al. |
| 2007/0220280 A1* | 9/2007 | Karam ................... H04L 12/10 |
| | | 713/300 |
| 2008/0062586 A1* | 3/2008 | Apfel ..................... H04L 12/10 |
| | | 361/18 |
| 2008/0164884 A1 | 7/2008 | Hussain et al. |
| 2009/0189646 A1* | 7/2009 | Cagno ................ G06F 13/4081 |
| | | 327/77 |
| 2010/0117808 A1 | 5/2010 | Karam |
| 2011/0055598 A1 | 3/2011 | Yu |
| 2013/0257161 A1* | 10/2013 | Ferentz ................... H02J 4/00 |
| | | 307/80 |

\* cited by examiner

DETECTION AND CLASSIFICATION SCHEME FOR POWER OVER ETHERNET SYSTEM

CROSS-REFERENCE TO RELATED APPLICATIONS

This application is based on and claims priority from U.S. Provisional Application Ser. No. 61/885,195, filed Oct. 1, 2013, by David Dwelley et al., incorporated herein by reference.

FIELD OF THE INVENTION

This invention relates to systems, such as Power Over Ethernet (PoE), where power is transmitted over data lines and a routine is carried out before the full PoE voltage is applied to the data lines. The invention more particularly relates to a scheme that identifies to the Power Sourcing Equipment (PSE) that the Powered Device (PD) is PoE-enabled and the PDs power requirements.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference.

Providing power over data lines is applicable to other existing systems and future systems. For example, electronic equipment in automobiles will increasingly benefit from power to the equipment being provided over the data lines to reduce wiring. Various new systems using power over data lines may be standardized by the IEEE or other groups.

Such systems using power over data lines may or may not require handshaking protocols. The present invention applies to systems requiring some sort of indication from the PD that the full PoE voltage is to be applied to the data lines.

Although the present invention may be applied to any system using power over data lines, a typical PoE system will be described as an example.

Figure 1:
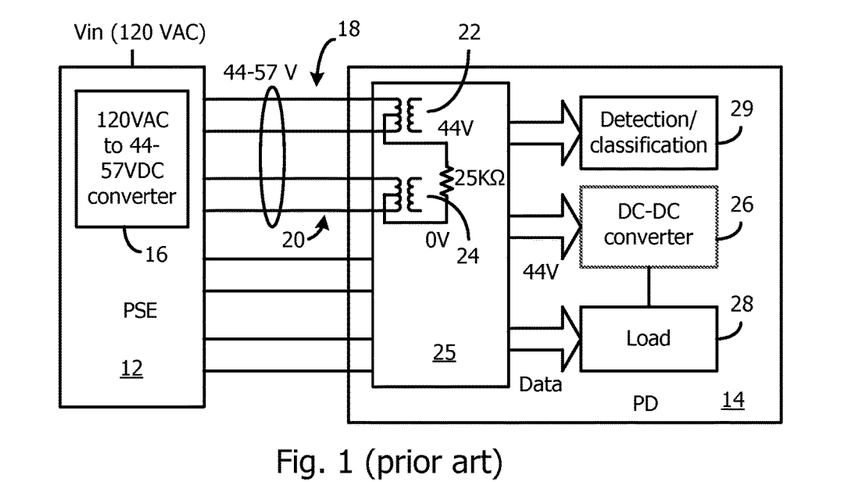
FIG. 1 illustrates a conventional PoE-enabled Ethernet system.

FIG. 1 represents a typical Ethernet system using PoE. In the example of FIG. 1, a "Power Sourcing Equipment" (PSE) 12 may be any Ethernet device that supplies power and data to a PD. The PSE 12 and PD 14 are typically connected via a standard CAT-5 cable terminated with the standard Ethernet 8-pin (four twisted pairs) RJ45 connector. Only two of the twisted pairs are typically needed for PoE and data.

The PSE 12 is typically powered by the mains voltage (120 VAC) and uses either an external or internal voltage converter 16 to generate a DC voltage between 44-57 volts. The PoE standards require the PSE to supply a minimum of 37 volts at the PD. The voltage drop along the cable increases with distance.

Two of the twisted pairs 18 and 20 are assigned to carry the PoE power, and these pairs may also carry differential data. The remaining two pairs are also shown. All pairs in use are terminated at the PD 14 by transformers, such as transformers 22 and 24. It is assumed that the twisted pair 18 provides 44 volts and the twisted pair 20 is connected to ground. A connection is made to the center tap of transformers 22 and 24 to provide the 44 volts to the PD 14. Since the DC voltage is common mode, it does not affect the differential data. Other conventional termination circuitry is also included in the termination block 25, such as polarity correction circuitry (a diode bridge) downstream from the transformers, but is not relevant to the present invention.

The 44 volts is applied to a DC-DC converter 26 for converting the voltage to any voltage or voltages required by the PD 14. The load 28 (e.g., a security camera) is powered by the converter 26 and communicates with the PSE 12 via the twisted wire pairs.

The IEEE standards require certain low current handshaking procedures between the PSE 12 and PD 14 in order to detect the presence of a PoE-powered device and in order to convey the pertinent characteristics of the PSE 12 and PD 14 prior to the PSE 12 making the full power available to the PD 14. The detection/classification circuit 29 controls the handshaking routine, and may be a state machine, a processor, or any other suitable control circuit. The PSE 12 also contains a circuit for carrying out the handshaking routine. The circuits for carrying out the handshaking routine are well-known ICs.

Below is a simplified summary of the handshaking routine between the PSE 12 and the PD 14.

When the PSE 12 is first connected to the PD 14 via an Ethernet cable, the PSE 12 interrogates the PD 14 to determine if it is PoE-enabled. This period is termed the detection phase. During the detection phase, the PSE 12 applies a first current limited voltage for a fixed interval to the PD 14, via the twisted wire pairs 18 and 20, and then applies a second current limited voltage for a fixed interval, while looking for a characteristic impedance of the PD 14 (about 25k ohms) by detecting the resulting current. If the correct impedance is not detected, the PSE 12 assumes that the load is not PoE-enabled and shuts down the PoE generating end. The system then operates as a standard Ethernet connection.

If the signature impedance is detected, the PSE 12 moves on to an optional classification phase. The PSE 12 ramps up the voltage to the PD 14. The PSE 12 generates either one pulse (indicating it is a Type 1 PSE) or two pulses (indicating it is a Type 2 PSE). The PD 14 responds to the classification pulses with certain current levels to identify whether the PD 14 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. A classification resistance may be used. The PSE 12 then may use this power demand information to determine if it can supply the required power to the PD 14, and the PD 14 uses the information to determine if it can fully operate with the PSE 12. There are maximum time windows for the detection and classification phases (e.g., 500 ms).

Other types of detection and classification routines and standards may be implemented in the future.

On completion of the detection and classification phases, the PSE 12 ramps its output voltage above 42 V. Once an under-voltage lockout (UVLO) threshold has been detected at the PD 14, an internal FET is turned on to connect the full PoE voltage to the converter 26, and the converter 26 supplies a regulated DC voltage to the load 28. At this point, the PD 14 begins to operate normally, and it continues to operate normally as long as the input voltage remains above a required level.

As seen, the handshaking operation requires multiple low-current operations that take time to conduct. Further, the PD must contain a PoE controller IC for generating the various handshaking signals, and such an IC adds cost to each PD. Further, the 25k ohm resistor adds to the current draw by the PD during normal operation.

What is needed is a new technique to identify to the PSE that the PD is PoE enabled and to identify the power requirements of the PD, such as whether the PD is a Type 1 or Type 2 device, where the technique does not suffer from the drawbacks of the prior art technique.

SUMMARY

The present invention is a single step detection and classification technique for identifying to the PSE that the PD is PoE-enabled and identifying the type of PD, such as Type 1 or Type 2. The single step technique may also identify other information about the PD.

In one embodiment, the PD designer selects a capacitor having a particular value that corresponds to the PoE power level required by the PD. The capacitor is connected across the PD's wire pairs downstream from the input transformers and prior to the switch that connects the PoE wires to the PD's converter.

When the PSE is initially connected to the PD via the standard Ethernet cabling, or when the PSE is powered up, the PSE is internally controlled to supply a predetermined low DC current to the Ethernet wire pairs. The fixed current charges the capacitor at the front end of the PD to cause the capacitor to generate a ramping voltage, where the slope of the ramp is determined by the capacitance value. Since the current is low, there is very little voltage drop along the cable.

A first switch internal to the PD is open between the capacitor and the downstream PD circuitry to isolate the capacitor so the downstream circuitry does not affect the capacitance sensed by the PSE. The first switch can be eliminated if the downstream capacitance is insignificant.

A comparator in the PSE detects when the ramping voltage crosses a known threshold value. The time between the application of the current and the crossing of the threshold value directly correlates to the value of the capacitor ($C=i*t/v$). In one example, if the time is within a first range of times, the PSE determines that the PD capacitor has a first value indicating that the PD is PoE-enabled and is a Type 1 PD. If the time is within a second range of times, the PSE determines that the PD capacitor has a second value indicating that the PD is PoE-enabled and is a Type 2 PD. Further information about the PD may be determined based on the time it takes for the ramping voltage to exceed the threshold.

After the threshold is crossed, the PSE stops applying the low current to the PD. The first switch is then closed to connect the downstream PD circuitry to the PD input terminals.

The "delay" time Td is applied to a controller in the PSE. If the Td is associated with a Type 1 PD, the controller controls the PSE's power supply to supply the full PoE voltage to the Ethernet wires and implements the various constraints related to a Type 1 PD, such as current/power limiting. If the Td is associated with a Type 2 PD, the controller controls the PSE's power supply to supply the full PoE voltage to the Ethernet wires and implements the various constraints related to a Type 2 PD. Additional Td ranges can be associated with other parameters of the PD, such as additional types, identification, telemetry, etc.

The PD then detects that the PSE voltage exceeds the UVLO threshold and closes a second switch downstream from the capacitor that couples the PSE voltage to the PD's converter. The converter then regulates the PSE voltage and powers the PD load. Since the PD capacitor is connected across a DC voltage, it does not adversely affect the voltage or power consumed by the PD. Advantageously, the capacitor also serves to filter transients on the PoE lines. In another embodiment, the capacitor is switched out during normal operation.

The capacitor values for each type of PD may be standardized. Since the ramping up of the voltage to exceed the threshold may be very fast and only requires the single step of applying a low current by the PSE, the handshaking between the PSE and PD is very simple and fast. Also, no PD controller IC is needed for the handshaking. The capacitor may be formed as part of a PD integrated circuit or may be a separately-connected discrete capacitor.

In another embodiment, instead of a capacitor, a zener diode or other voltage limiter is connected across the wire pairs in the PD. The voltage limit value is selected to convey the PD type (or other parameters) in accordance with a predetermined standard. The PSE applies a low DC current to the wire pairs, which creates a particular voltage drop across the voltage limiter. The PSE measures the voltage drop (or other limited voltage) and correlates the voltage drop to the corresponding PD type. The PSE power supply and other circuitry are then controlled to power the PD in accordance with the appropriate PoE standard.

In another embodiment, a resistor is connected across the wire pairs in the PD. The resistor value is selected to convey the PD type (or other parameters) in accordance with a predetermined standard. The PSE applies a ramping voltage to the wire pairs, which creates a ramping current through the wire pairs. The PSE measures the current and, when the current exceeds a threshold, the voltage is measured. The measured voltage correlates to the corresponding PD type. The PSE power supply and other circuitry are then controlled to power the PD in accordance with the appropriate PoE standard.

In the various embodiments, the analog amplitude of a single detected signal resulting from the capacitor, zener diode, or resistor determines the information about the PD.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

Elements that are the same or equivalent are labeled with the same numeral.

DETAILED DESCRIPTION

The various circuits shown represent the pertinent aspects of a system, such as a PoE-enabled Ethernet system, where power is supplied over data lines. Other portions of a PoE system, such as data paths, are independent of the invention and may be conventional.

Figure 2:
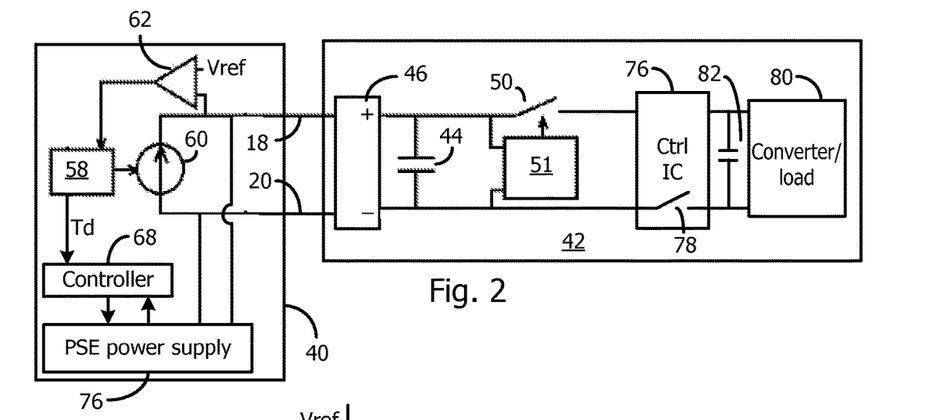
FIG. 2 illustrates a PoE system that detects a value of a PD capacitor to determine the PoE requirements of the PD, in accordance with one embodiment of the invention.

In FIG. 2, a PSE 40 is configured to detect the PoE requirements of the PD 42, then provide the proper PoE voltage and maximum power to the PD 42. For simplicity, the examples given identify whether the PD is a Type 1 PD (up to 13 W) or a Type 2 PD (up to 25.5 W). Such identification simultaneously identifies to the PSE 40 that the PD is PoE-enabled, so the detection and classification are performed in the same step. The circuits described may also be used to identify additional types, such as one of five types, and identify any other information to the PSE 40 about the PD 42, such as identification, telemetry, etc.

In the example, the PD type is conveyed by the value of a capacitor 44 coupled to the PD input terminals downstream from the front end circuit 46. The selected value of the capacitor 44 can be used to identify any current or power classification of the PD 42. A standard correlates the capacitor value to the PD's PoE requirements. The information conveyed by the capacitor 44 value can represent to the PSE 40 a collection or categorization of various requirements so that the PSE 40 may budget the output current or power according to a range of requirements rather than to one specific requirement. This may simplify a PSE implementation and ease standardization of the current/power classification scheme.

Upstream from the capacitor 44 in the PD 42 are the conventional input transformers, shown in FIG. 1, and a conventional diode bridge used as a polarity correction circuit in the event the PSE 40 is incorrectly coupled to the wires. These conventional circuits are in the front end circuit 46. The wires pairs 18 and 20 are simplified to show only one wire per pair. It is assumed that wire pair 20 is grounded, although this does not have to be the case.

Figure 4:
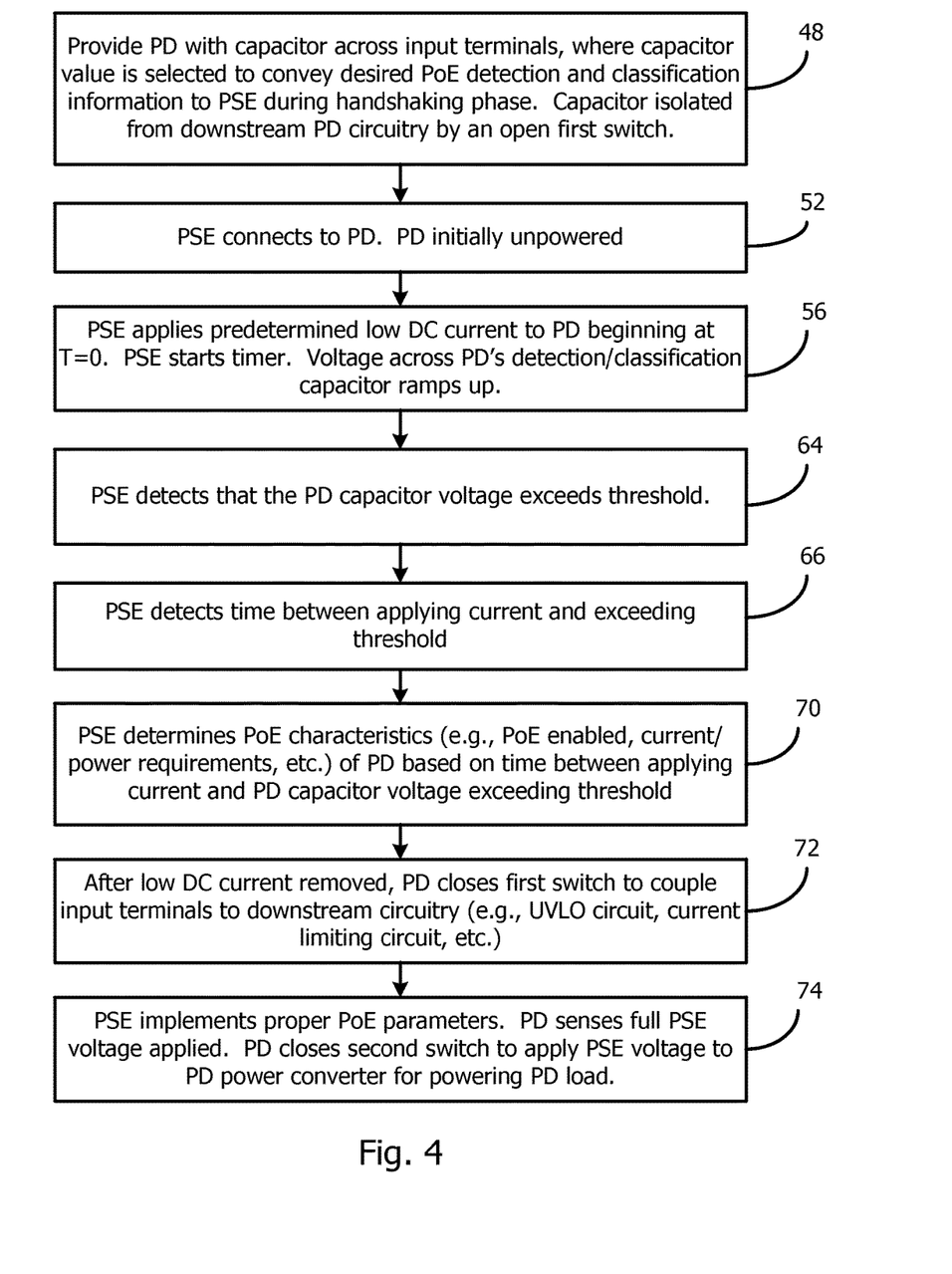
FIG. 4 is a flowchart identifying various steps performed by the system of FIG. 2.

The description of the PoE system of FIG. 2 will be described with reference to the flowchart of FIG. 4.

In step 48, the system designer or user provides the capacitor 44 with the proper value corresponding to the PD type (Type 1 or Type 2). The capacitor 44 is isolated from downstream PD circuitry by a first switch 50 so the downstream circuitry does not affect the capacitance value detected by the PSE 40. A switch controller 51 for the first switch 50 keeps the first switch 50 open until the PSE 40 is finished with the low current detection/classification routine.

In step 52, the PSE 40 is connected to the PD 42 via the wire pairs 18 and 22, or the PSE 40 is initially powered up. The PSE 40 then automatically performs the following routine, which may be controlled by a state machine, a programmed processor, or other suitable circuit in the PSE 40.

Figure 3:
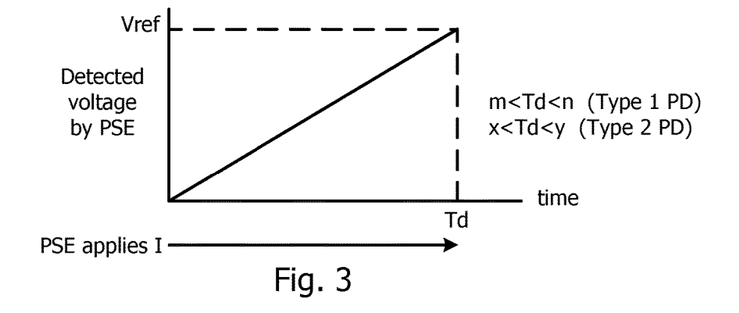
FIG. 3 illustrates the voltage ramp generated by a PD capacitor in response to a low current supplied by the PSE, where the time it takes to cross a threshold conveys PoE characteristics of the PD.

In step 56, the PSE timing and processing circuit 58 controls a current source 60 to apply a low predetermined current through the wires pairs 18/20 to charge the capacitor 44. Therefore, as the PSE 40 applies the current, the voltage across the wire pairs 18/20 ramps up, as shown in FIG. 3. The correspondence between voltage, current, capacitance, and time is given by the equation $C=i*t/v$.

A comparator 62 in the PSE 40 compares the ramping voltage to a known reference voltage Vref (a threshold voltage). In step 64, when the ramp crosses Vref, the comparator 62 triggers and applies a signal to the circuit 58.

In step 66, the circuit 58 measures the time between the start of the current and the time that the voltage ramp crossed Vref. FIG. 3 shows the voltage ramp crossing Vref and the delay time Td measured by the circuit 58. The time Td directly correlates to the capacitor 44 value, which correlates to the PD type. This Td value is applied to a power supply controller 68. The circuit 58 then controls the current source 60 to cease applying current to the wire pairs 18/20.

In step 70, the time Td is applied to a look-up table or other circuit in the power supply controller 68 that correlates Td to the PoE requirements of the PD 42. FIG. 3 shows that a Td in the range of times m to n correlates to a Type 1 PD, and a Td in the range of times x to y correlates to a Type 2 PD. A range of Td's for each type is important since there is a slight voltage drop in the wire pairs 18/20 and the exact voltage drop is unknown due to the unknown length of the wire pairs 18/20. The characteristics of the ramping voltage also convey to the PSE 40 that the PD 42 is PoE-enabled by having an appropriate input capacitance value.

In step 72, the switch controller 51 closes the first switch 50 without affecting the PoE information conveyed to the PSE 40.

In step 74, the power supply controller 68 controls the PSE power supply 76 to supply the full PoE voltage (e.g., 57 volts) to the wire pairs 18/20. The controller 68 also implements suitable current limiting circuits and other circuits that correspond with the detected PD type. Such circuits may perform functions specified by the IEEE PoE standards. The switch controller 51 may be powered by this increased PSE voltage. The switch controller 51 may detect the PSE voltage exceeding a threshold and close the first switch 50.

Also in step 74, the PD controller IC 76 detects that the PSE voltage has exceeded a threshold, via UVLO circuitry, and closes a second switch 78, which couples the PSE voltage to the input of a converter 80. An input capacitor 82 smoothes switching transients. The converter 80 then supplies a regulated voltage or current to the PD load. The controller IC 76, converter 80, and load may be conventional.

The capacitor 44 does not adversely affect the PoE during normal operation since the voltage is DC. The capacitor 44 advantageously serves as an additional filter for filtering transients. However, if it is desired for the capacitor 44 to be effectively removed during normal operation of the PD, a switch in series with the capacitor 44 may be controlled by the switch circuit 51 to be opened when switch 50 is closed.

As seen, the detection and classification are performed simultaneously in a single operation, and the ramping of the voltage to the threshold can occur very quickly. The Td times may be divided up into any number of ranges, where each range identifies the type of PD or a set of PD characteristics.

In an alternative embodiment, the circuit 58 controls the current source 60 to supply a predetermined current for a fixed time. The resulting voltage is then measured by the circuit 58. This voltage then corresponds to the capacitance value as per the equation C=i*t/v. The detected voltage is then cross-referenced to the PD type, which is identified by the capacitor 44 value. The power supply 76 and other circuitry are then controlled in accordance with the IEEE standards for that particular PD type. The voltage may convey any other characteristics about the PD 42.

In an alternative embodiment, the PSE generates a sinusoidal voltage or current at a particular frequency, and the AC impedance across the wire pairs 18/20 is measured to determine the capacitance value, which conveys the PoE requirements of the PD, as discussed above. The AC impedance may be determined by measuring the amplitude and phase of the resulting signal.

Any other methods to identify the value of the capacitor 44, whether it is by the PSE 40 applying a fixed or time-varying current or voltage, are contemplated by this invention.

In a related embodiment, a resistor, having a known value, is connected in series with the capacitor 44, and a predetermined sinusoidal AC signal is applied by the PSE to the wire pairs 18/20. The resulting time constant is then derived from the resulting signal. Since the resistor value and driving signal are known by the PSE, the time constant can be used to derive the capacitance value corresponding to the PoE requirements of the PD.

Further, using a set of standardized capacitance values to communicate to the PSE any operational information and/or requirements of a PD is contemplated by this invention. Operational information may include, but is not limited to, power requirements/classification, telemetry, identification, etc.

This technique applies to non-PoE systems as well, where a PD receives power via one or more data lines.

Figure 5:
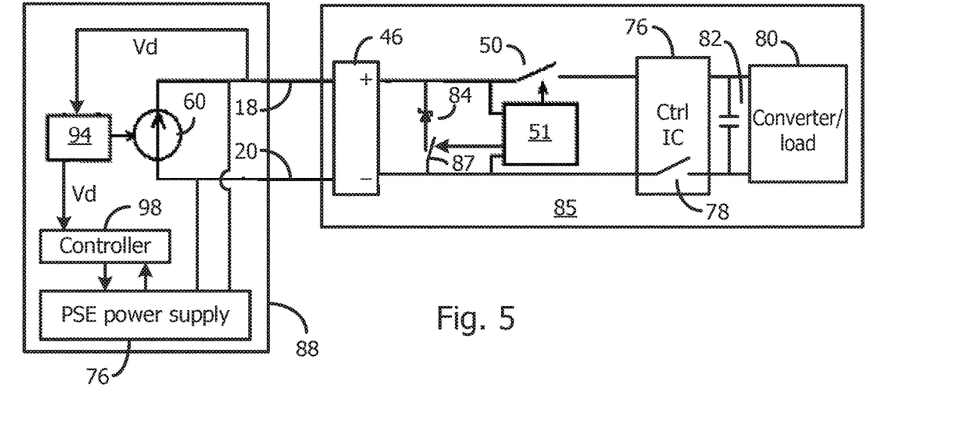
FIG. 5 illustrates a PoE system that detects a value of a limited voltage in the PD to determine the PoE requirements of the PD, in accordance with another embodiment of the invention.
Figure 6:
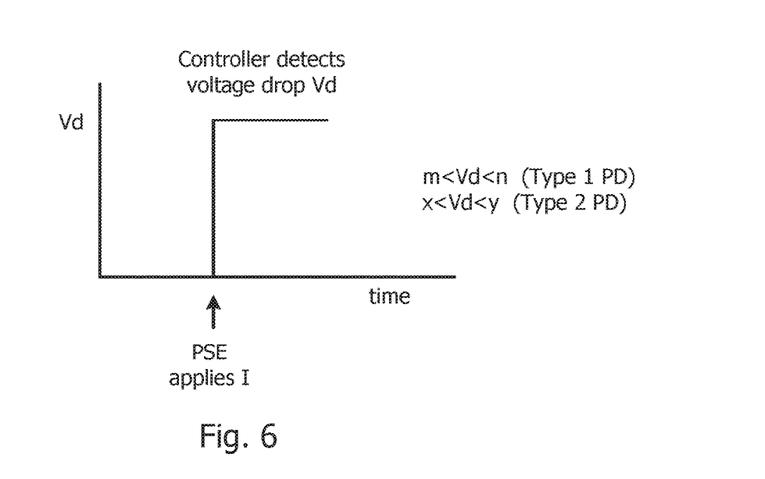
FIG. 6 illustrates the voltage drop across a zener diode used in the embodiment of FIG. 5 in response to a low current supplied by the PSE, where the voltage drop conveys PoE characteristics of the PD.
Figure 7:
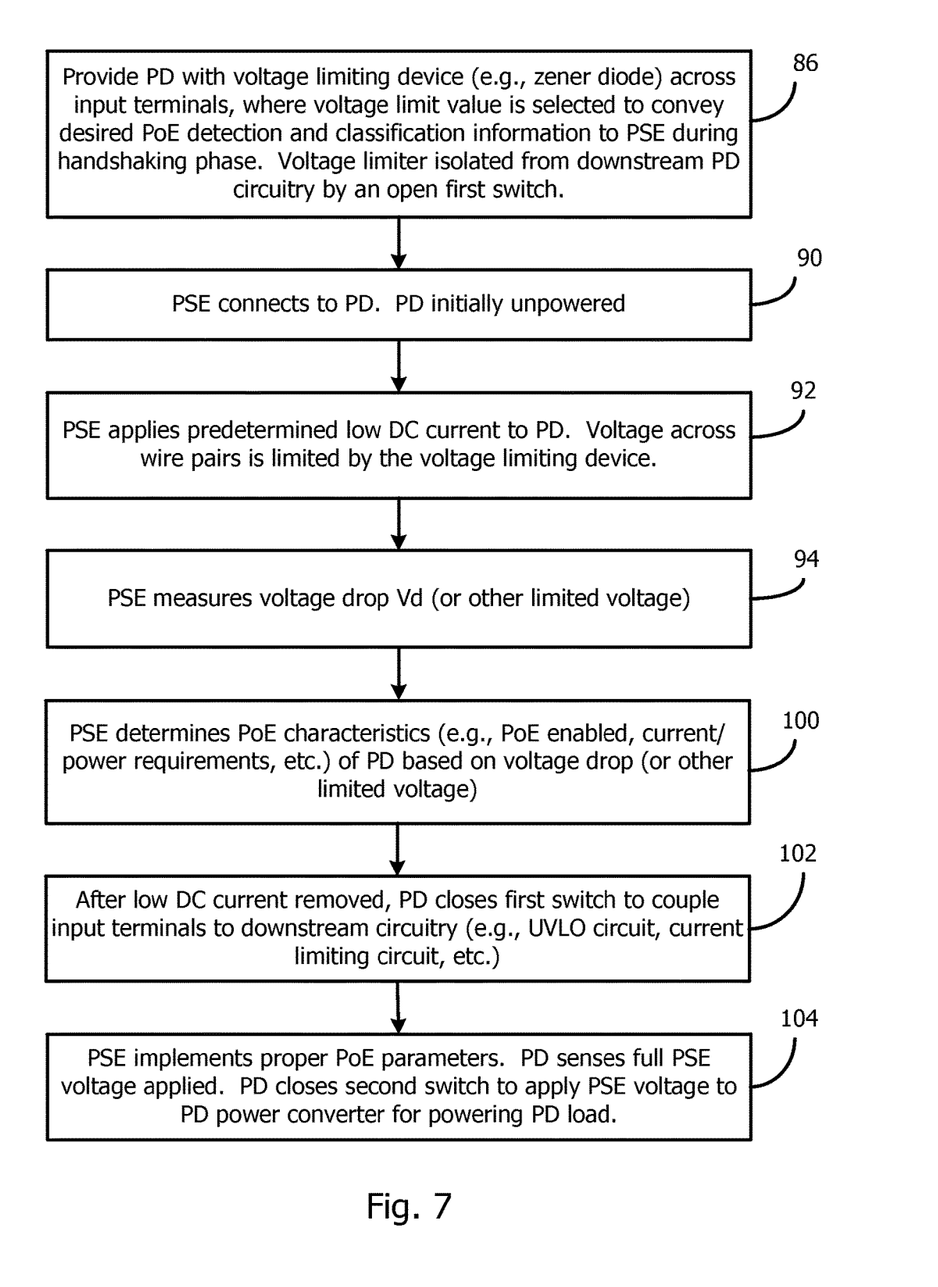
FIG. 7 is a flowchart identifying various steps performed by the system of FIG. 5.

FIGS. 5-7 illustrate an alternative embodiment, where the PD characteristics are conveyed by the selection of a voltage limiting circuit at the front end of the PD.

In FIG. 5, the capacitor 44 of FIG. 2 is replaced with a zener diode 84 whose reverse bias breakdown voltage conveys the PD's relevant PoE information, such as the type of PD (e.g., Type 1 or Type 2). Any other voltage limiting device can be used instead of the zener diode 84, such as a shunt voltage regulator, a series connection of diodes, or other device which only conducts when the voltage across it reaches a selectable voltage. Since the PSE voltage can be as high as 57 volts, the zener diode 84 breakdown voltage must be higher than 57 volts, or the zener diode 84 must be switched out of the PD 85 after the low current handshaking phase. Switching out the zener diode 84 during normal operation of the PD may be done with a switch 87 in series with the zener diode 84 controlled by the switch circuit 51, where the switch 87 is opened when the switch 50 is closed.

The description of the operation of the circuit of FIG. 5 is given with reference to the flowchart of FIG. 7.

In step 86, the system designer or user provides the zener diode 84 (or other voltage limiter) with the proper standardized limiting voltage value (e.g., voltage drop) corresponding to the PD type (Type 1 or Type 2). The zener diode 84 is isolated from downstream PD circuitry by a first switch 50 so the downstream circuitry does not affect the voltage drop detected by the PSE 88. A switch controller 51 for the first switch 50 keeps the first switch 50 open until the PSE 88 is finished with the low current detection/classification routine. The first switch 50 and the switch controller 51 are optional if no downstream circuitry would affect the detected voltage drop.

In step 90, the PSE 88 is connected to the PD 85 via the wire pairs 18 and 22. The PSE 88 then automatically performs the following routine, which may be controlled by a state machine, a programmed processor, or other suitable circuit in the PSE 88.

In step 92, the PSE control and processing circuit 94 controls a current source 60 to apply a low predetermined current through the wires pairs 18/20 to cause the zener diode 84 to break down at the predetermined voltage. FIG. 6 illustrates the how the zener diode 84 creates a voltage drop Vd across wire pairs 18/20 upon application of the current.

In step 96, the circuit 94 measures the voltage drop Vd. The voltage drop Vd directly correlates to the to the PD type. This Vd value is applied to a power supply controller 98. The circuit 94 then controls the current source 60 to cease applying current to the wire pairs 18/20.

In step 100, the voltage drop Vd is applied to a look-up table or other circuit in the power supply controller 98 that correlates Vd to the PoE requirements of the PD 85. FIG. 6 shows that a Vd in the range of m to n correlates to a Type 1 PD, and a Vd in the range of x to y correlates to a Type 2 PD. A range of Vd's for each type is important since there is a slight voltage drop in the wire pairs 18/20 and the exact voltage drop is unknown due to the unknown length of the wire pairs 18/20. The voltage drop simultaneously conveys to the PSE 88 that the PD 85 is PoE-enabled by having an appropriate voltage drop value.

In step 102, the switch controller 51 closes the optional first switch 50 without affecting the PoE information conveyed to the PSE 88. For example, the switch controller 51 may detect that the low current operation has ceased by detecting the termination of the voltage drop, or the switch controller 51 may detect the PSE voltage exceeding a threshold (after step 104) and close the first switch 50.

In step 104, the power supply controller 98 controls the PSE power supply 76 to supply the full PoE voltage (e.g., 57 volts) to the wire pairs 18/20. The controller 98 also implements suitable current limiting circuits and other circuits that correspond with the detected PD type. Such circuits may perform functions specified by the IEEE PoE standards. The switch controller 51 may be powered by this increased PSE voltage.

Also in step 104, the PD controller IC 76 detects that the PSE voltage has exceeded a threshold, via UVLO circuitry, and closes a second switch 78, which couples the PSE voltage to the input of a converter 80. An input capacitor 82 smoothes switching transients. The converter 80 then supplies a regulated voltage or current to the PD load. The controller IC 76, converter 80, and load may be conventional.

As seen, the detection and classification are performed in a single operation, and the detection of the voltage drop can occur very quickly. Voltage drops may be divided up into any number of ranges, where each range identifies the type of PD or a set of PD characteristics.

In another embodiment, the PSE generates a ramping voltage, and the time that it takes before the voltage becomes limited by the voltage limiting device in the PD determines the PD type or conveys other information.

Figure 8:
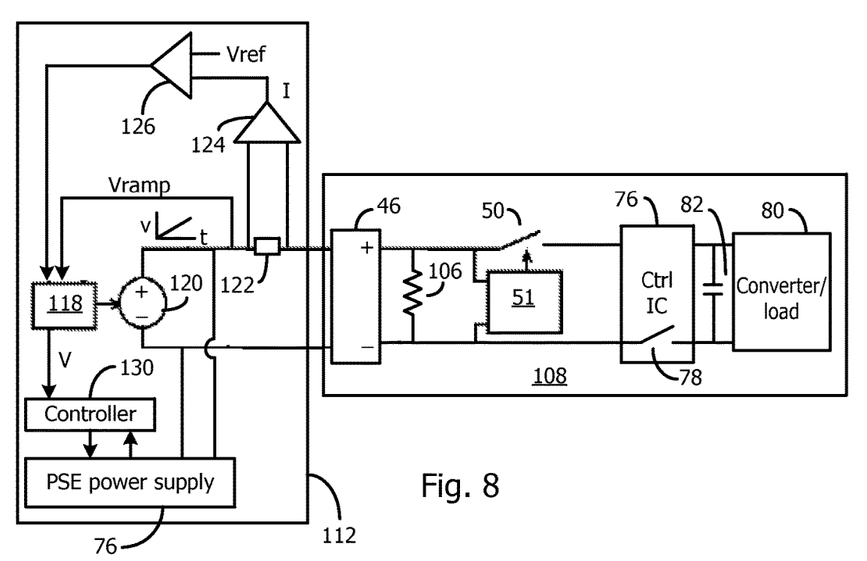
FIG. 8 illustrates a PoE system that detects a value of a resistance in the PD to determine the PoE requirements of the PD, in accordance with another embodiment of the invention.
Figure 9:
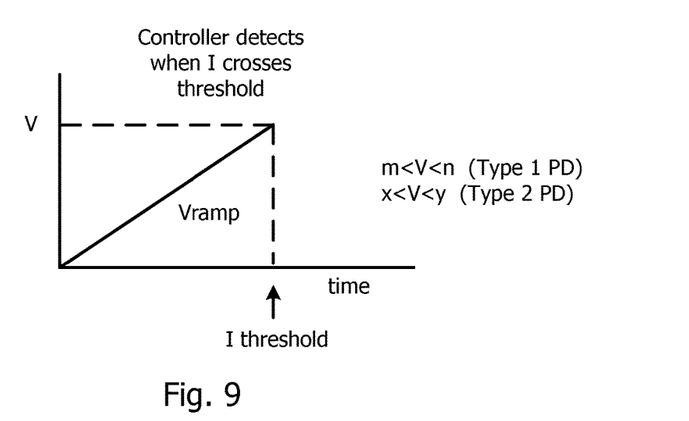
FIG. 9 illustrates a voltage ramp generated by the PSE and a current threshold, where the voltage measured when the current exceeds the threshold correlates with the resistance value and hence to the PoE characteristics of the PD.
Figure 10:
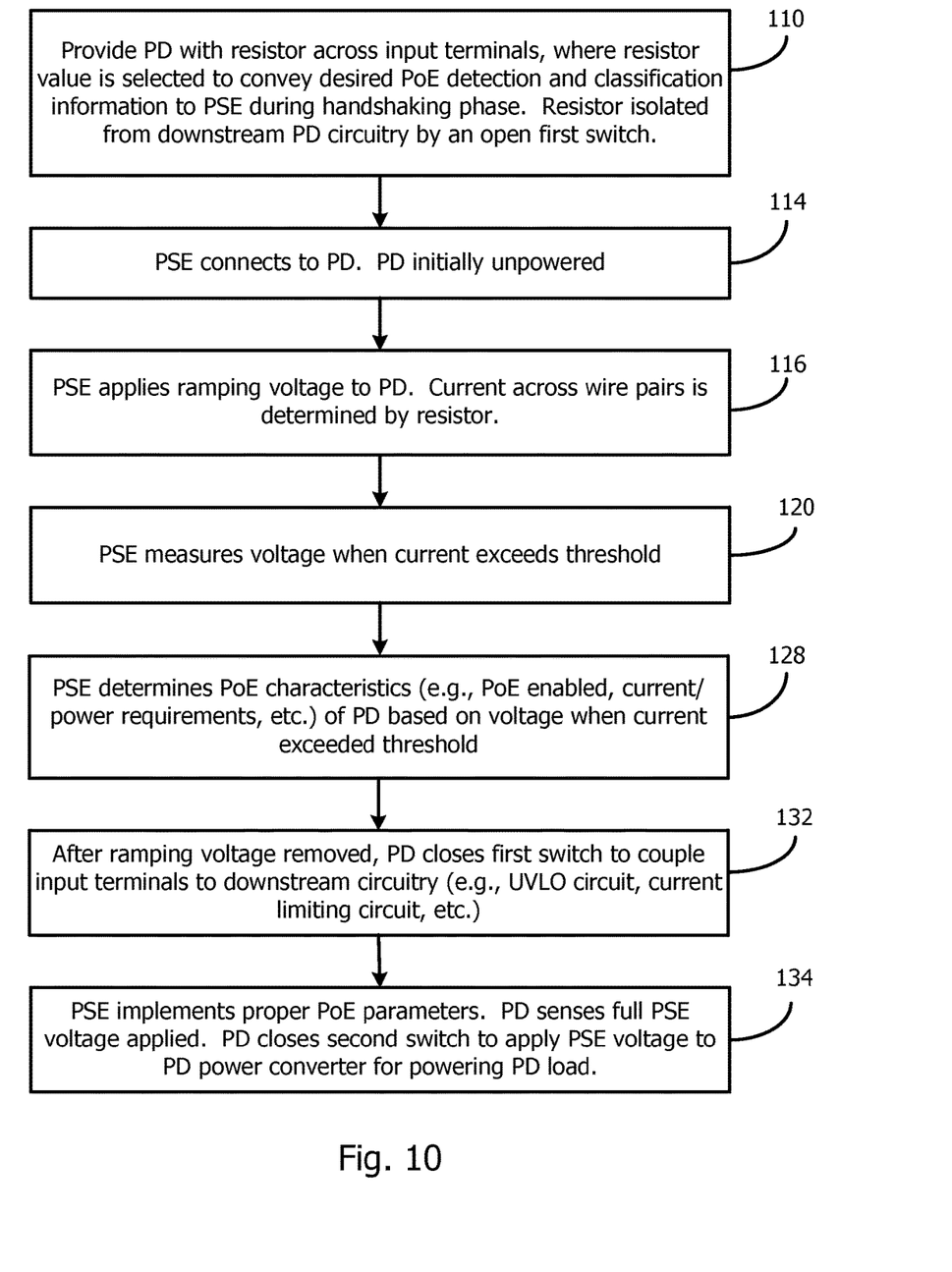
FIG. 10 is a flowchart identifying various steps performed by the system of FIG. 8.

FIGS. 8-10 illustrate another embodiment, where a ramping voltage generated by the PSE in the wire pairs 18/20 causes a selected resistance at the input of the PD to draw a ramping current. The resistance corresponds to the type of PD. The voltage level at the time when the detected current exceeds a threshold correlates to the type of PD. Alternatively, a fixed voltage may be applied to the wire pairs 18/20 and the resulting current is used to determine the type of PD.

In FIG. 8, the capacitor 44 of FIG. 2 is replaced with a resistor 106 whose value conveys the PD's relevant PoE information, such as the type of PD (e.g., Type 1 or Type 2). The resistor 106 may be switched out of the PD 108 after the low current handshaking phase. This may be done with a switch in series with the resistor 106 controlled by the switch circuit 51, where the switch is opened when the switch 50 is closed.

The description of the operation of the circuit of FIG. 8 is given with reference to the flowchart of FIG. 10.

In step 110, the system designer or user provides the resistor 106 with a standardized value corresponding to the PD type (Type 1 or Type 2). The resistor 106 is preferably a high value resistor. The resistor 106 is isolated from downstream PD circuitry by a first switch 50 so the downstream circuitry does not affect the current detected by the PSE 112. A switch controller 51 for the first switch 50 keeps the first switch 50 open until the PSE 112 is finished with the low current detection/classification routine. The first switch 50 and the switch controller 51 are optional if no downstream circuitry would affect the detected current.

In step 114, the PSE 112 is connected to the PD 108 via the wire pairs 18 and 22, or the PSE 112 is powered up. The PSE 112 then automatically performs the following routine, which may be controlled by a state machine, a programmed processor, or other suitable circuit in the PSE 112.

In step 116, the PSE control and processing circuit 118 controls a variable voltage source 120 to apply a ramped voltage to the wires pairs 18/20 to cause a ramping current to flow through the resistor 106.

In step 120, the current through a low value resistor 122 in the PSE 112 is detected by a difference amplifier 124, and a comparator 126 compares the current value to a reference voltage Vref. When the current crosses the threshold value, the comparator 126 sends a signal to the circuit 118. The circuit 118, which also detects the ramping voltage, identifies the voltage value V at the time the current reached the predetermined threshold value. A sample and hold circuit may be used to store the voltage value. The value of the resistor 106 is thus determined by R=V/I.

In step 128, the voltage value V is then applied to a power supply controller 130. The voltage value is applied to a look-up table or other circuit in the power supply controller 130 that correlates V to the PoE requirements of the PD 108. FIG. 9 shows that a V in the range of m to n correlates to a Type 1 PD, and a V in the range of x to y correlates to a Type 2 PD. A range of V for each type is important since there is a slight voltage drop in the wire pairs 18/20 and the exact voltage drop is unknown due to the unknown length of the wire pairs 18/20. The voltage value also simultaneously conveys to the PSE 112 that the PD 108 is PoE-enabled by having an appropriate voltage value.

In step 132, the switch controller 51 closes the optional first switch 50 without affecting the PoE information conveyed to the PSE 112. For example, the switch controller 51 may detect that the low current operation has ceased by detecting the termination of the voltage, or the switch controller 51 may detect the PSE voltage exceeding a threshold (after step 134) and close the first switch 50.

In step 134, the power supply controller 130 controls the PSE power supply 76 to supply the full PoE voltage (e.g., 57 volts) to the wire pairs 18/20. The controller 130 also implements suitable current limiting circuits and other circuits that correspond with the detected PD type. Such circuits may perform functions specified by the IEEE PoE standards. The switch controller 51 may be powered by this increased PSE voltage.

Also in step 134, the PD controller IC 76 detects that the PSE voltage has exceeded a threshold, via UVLO circuitry, and closes a second switch 78, which couples the PSE voltage to the input of a converter 80. An input capacitor 82 smoothes switching transients. The converter 80 then supplies a regulated voltage or current to the PD load. The controller IC 76, converter 80, and load may be conventional.

As seen, the detection and classification are performed in a single operation, and the detection of the voltage V can occur very quickly. The voltage values may be divided up into any number of ranges, where each range identifies the type of PD or a set of PD characteristics. In the various embodiments, the magnitude of the analog amplitude of a single detected signal, resulting from the value of the capacitor 44, zener diode 84, or resistor 106, at a particular time determines the information about the PD. The particular time may be when the signal crosses a threshold, or at a time after current is applied to the wire pairs. In conventional PoE systems, the PD's PoE characteristics are essentially conveyed digitally, so the handshaking process is more complex and time-consuming.

In another embodiment, the PSE generates a ramping current, and the current at the time that the voltage exceeds a predetermined threshold is used to determine the PD type or conveys other information.

Any of the features described throughout this entire disclosure may be combined. For example, a resistor may be connected in parallel with a voltage limiting device or a capacitor for conveying addition information based on the V/I waveform.

Other suitable elements may be used instead of the capacitor 44, zener diode 84, and resistor 106 to provide a characteristic current, voltage, or time that corresponds to particular PoE characteristic of the PD.

This fast single step technique for performing detection and classification can be applied to any system that requires handshaking before applying full operating voltage on data wires.

In addition to the PD conveying PoE information to the PSE by use of the capacitor 44, zener diode 84, resistor 106, or any other suitable circuit connected across the wire pairs 18/20, the PD may also detect, from the PSE's low current signal, that the PSE is a certain type of PSE that is compatible with the PoE requirements of the PD. Once it has been established by the PD that the PSE is a proper PSE, the PD may close the first switch 50 to receive the PoE voltage. For example, the PD may look for a particular fixed current, ramping voltage, etc. that indicates that the PSE is compatible.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power Over Ethernet (PoE) system comprising:
Power Sourcing Equipment (PSE) providing data and voltage over Ethernet wires, the PSE having a voltage source for generating a PoE voltage for transmission on the Ethernet wires; and
a Powered Device (PD) connected to the PSE by at least the Ethernet wires to receive the data and voltage, the PoE voltage having a first magnitude for powering the PD,
the PD comprising a voltage limiting circuit electrically coupled to input terminals of the PD, wherein the voltage limiting circuit responds in a predetermined manner to a first signal generated by the PSE to create a voltage-limited signal, and wherein the voltage limiting circuit is selected to convey particular PoE requirements of the PD, the voltage limited signal being less than the PoE voltage having the first magnitude;
the PSE further comprising:
a first signal generator providing the first signal on the Ethernet wires to the input terminals of the PD at a particular time, wherein the first signal is applied to the voltage limiting circuit in the PD;
a first detector detecting the voltage-limited signal, generated by voltage limiting circuit in the PD, in response to the first signal; and
a processing circuit configured for detecting the voltage-limited signal and, in response to a detected magnitude of the voltage-limited signal, associating the voltage-limited signal with the particular PoE requirements of the PD, and controlling the PSE to supply power to the PD via the Ethernet wires consistent with the PoE requirements of the PD conveyed by the voltage-limited signal;
a switch in the PD connected to disconnect the voltage limiting circuit from across the Ethernet wires after the PSE has determined the PoE requirements of the PD, such that the voltage limiting circuit does not limit the PoE voltage having the first magnitude.

2. The system of claim 1 wherein the first signal is a fixed current.

3. The system of claim 1 wherein the processing circuit comprises:
a controller circuit for controlling the PSE to supply power to the PD via the Ethernet wires consistent with the PoE requirements of the PD conveyed by the limited voltage.

4. The system of claim 1 wherein the first signal is a ramping voltage.

5. The system of claim 4 wherein the processing circuit comprises:
first detector configured to detect the voltage-limited signal in response to the ramping voltage signal; and
a controller circuit for controlling the PSE to supply power to the PD via the Ethernet wires consistent with the PoE requirements of the PD conveyed by the voltage-limited signal.

6. The system of claim 1 wherein the voltage limiting circuit comprises a Zener diode.

7. The system of claim 1 wherein the processing circuit is configured for determining a PD type, including Type 1 and Type 2, in accordance with IEEE standards for PoE.

8. The system of claim 1 further comprising:
a first switch in the PD isolating the voltage limiting circuit from downstream circuits in the PD that could affect a detected characteristic of the voltage limiting circuit by the PSE; and
a first switch controller configured for closing the first switch to connect the downstream circuits to the input terminals of the PD only after the PSE has determined the PoE requirements of the PD.

9. The system of claim 1 wherein the PD further comprises:
an undervoltage lock-out (UVLO) circuit that determines whether the PSE has supplied a PoE voltage exceeding a threshold;
a switch controlled by the UVLO circuit to be closed when the PoE voltage exceeds the threshold;
a PD converter connected to receive the PoE voltage when the switch is closed for regulating the PoE voltage; and
a PD load powered by the PD converter,
wherein the full PoE voltage is only provided by the PSE after the PSE has determined the PoE requirements of the PD.

10. The system of claim 1 wherein the voltage limiting circuit is connected across the Ethernet wires.

* * * * *